Oct. 13, 1953 C. C. CURTIS 2,655,195
CONVEYER BELT AND METHOD OF MAKING SAME
Filed Oct. 21, 1950
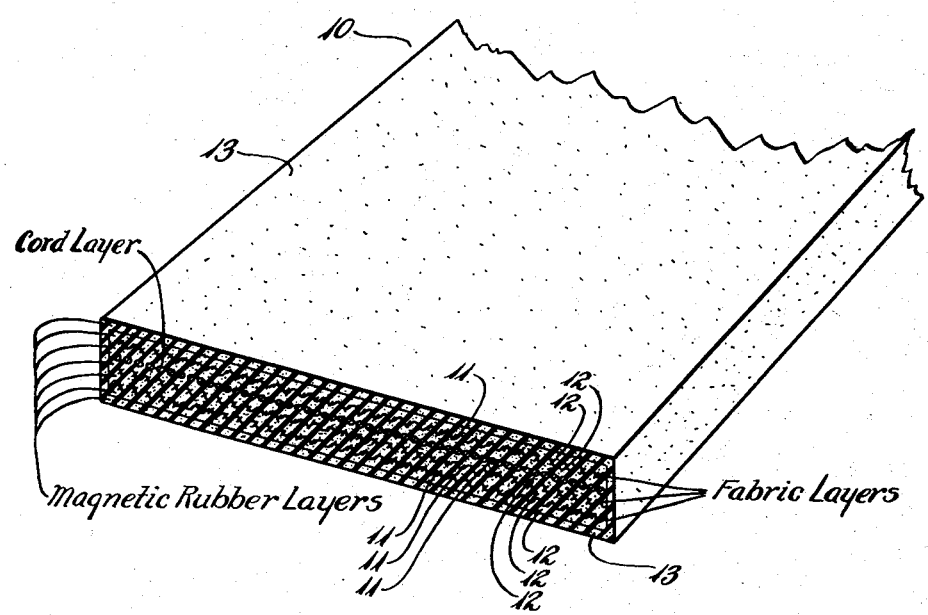
Inventor
Chalmer C. Curtis
By Robert W. Furlong
Atty.

UNITED STATES PATENT OFFICE 2,655,195

CONVEYER BELT AND METHOD OF MAKING SAME

Chalmer C. Curtis, Cuyahoga Falls, Ohio, assignor to The B. F. Goodrich Company, New York, N. Y., a corporation of New York Application October 21, 1950, Serial No. 191,466

8 Claims. (Cl. 154—4)

This invention relates to a novel flexible resilient article and pertains more particularly to a resilient elastomeric composition and article therefrom having magnetic properties and the method of making same.

It is an object of this invention to provide a flexible resilient elastomeric composition which is inherently magnetic.

It is also an object to provide a vulcanized rubbery composition which is inherently magnetic and which possesses high strength and flex resistance.

It is also an object of this invention to provide a rubbery flexible resilient belt, such as a conveyor or transmission belt, which is readily attracted by a magnetic force.

Still another object of this invention is to provide a vulcanizable magnetic elastomeric composition which has excellent adhesion and tensile strength properties enabling the composition to be utilized as a bonding material for textile fabrics and the like to form an integral laminated structure.

Another object of this invention is to provide a method of making a magnetic resilient elastomeric composition which may readily be molded or shaped into numerous configurations.

It is still another object of this invention to provide a magnetic conveyor belt which possesses excellent flexing properties.

Other objects of this invention will be apparent from the drawing and description which follow.

Although it has heretofore been proposed to incorporate iron dust or the like in resilient or rubber-like compositions in order to render them magnetic, such compositions are unsatisfactory in that the ultimate tensile strength and elongation of the resultant composition is greatly reduced, and the particles of such magnetic materials readily fall out of the resilient composition when it is stretched or flexed.

I have now discovered that an elastomeric composition having dispersed therein finely-divided magnetite fulfills the objects of this invention.

Among the elastomers, which term denotes all rubber-like substances as was pointed out by Fisher in his article "Nomenclature of Synthetic Rubbers" appearing in the August 1939 issue of "Industrial and Engineering Chemistry," vol. 31, No. 8, which may be employed in this invention are the vulcanizable rubbers, for example, natural rubber which is essentially a rubbery polymer of isoprene, such as caoutchouc and the like, or synthetic rubber, such as the rubbery polymers of open-chain conjugated diolefins having from four to eight carbon atoms exemplified by butadiene-1,3; 2,3-dimethyl butadiene-1,3; 1,4-dimethyl butadiene-1,3 and the like, or the rubbery copolymers of these and similar conjugated diolefins with each other or with copolymerizable monomeric materials containing a single ethylenic linkage, such as styrene, acrylonitrile, methyl acrylate, methyl methacrylate, ethyl acrylate, ethyl methacrylate, 2-vinyl pyridine, or similar materials, the rubbery polymers of chloroprene and the like, and the polyalkylene polysulfide rubbers, as well as such unvulcanizable materials as polyvinyl chloride, polyvinylidene chloride, copolymers of vinyl chloride or of vinylidene chloride with each other or with other copolymerizable monoethylenic monomeric materials, polyethylene, rubbery silicones, and other similar materials. Any of the usual plasticizers or softeners may be present in any of the compositions, as well as pigments, fillers, stabilizers, age resistors, etc., and in the case of the vulcanizable rubbery materials the usual vulcanizing agents and accelerators may also be present. Compositions containing the vulcanizable rubbery conjugated diene polymers are particularly important for this invention.

Magnetite is a black dense magnetic crystalline ferriferous oxide having the formula $FeO.Fe_2O_3$ (sometimes written $Fe_3O_4$ or $Fe:(FeO_2)_2$) and is sometimes referred to as magnetic iron oxide, black iron oxide, Hercules stone, or lodestone. Magnetite has a molecular weight of approximately 231.52 and a specific gravity of approximately 5.18 at room temperature (15 to 20° C.). Preferably the magnetite which is uniformly dispersed into the elastomeric composition is a material having a particle diameter from .01 to 20 microns, so that a flexible resilient composition having optimum physical and chemical properties is provided. To impart optimum physical and chemical properties to my magnetic composition, it is desirable that the composition comprise from 65 to 300 parts by weight of magnetite, preferably from 150 to 250 parts by weight, for every 100 parts by weight of elastomeric material.

To fully teach my invention reference will be made henceforth to a multiple ply conveyor belt, however, it will be understood that the laminated conveyor belt is merely an illustration of my invention and is not intended to limit its scope, since I contemplate the use of this invention in numerous resilient articles, such as toys, gaskets, gloves, etc., i. e., I contemplate the use of my invention in all resilient or rubber-like articles in which it is advantageous to incorporate magnetic properties.

The drawing is a perspective view partly broken away and in section of a conveyor belt embodying this invention.

As shown in the drawing, the conveyor belt 10 comprises several layers or plies of filamentary material such as textile fabric or longitudinally disposed cords 11, 11 arranged in any of the desired well known constructions and provide the necessary strength required in conveyor belts. Flexible resilient rubber-like layers 12, 12, one or more of which comprise my magnetic composition, are impregnated into and disposed over each of layers 11, 11 by frictioning or coating and serve to bond layers 11, 11 into an integral assembly generally referred to as the belt carcass. The number of plies incorporated in the belt carcass of a conveyor belt may vary in number dependent upon the strength and flexibility desired in a particular belt. Disposed over and adhered in direct contact to the belt carcass is a flexible resilient cover member 13 comprising my magnetic composition provided to protect the belt carcass from the elements, matter detrimental to the carcass, and abrasive wear. Cover member 13 is often not required, if the conveyor belt is not subjected to conditions extremely detrimental to the belt carcass, in which case conveyor belt 10 may consist solely of the belt carcass. After assembling the belt in the usual manner, it is vulcanized by heating in a press for 25 minutes at 285° F.

My magnetic elastomeric composition incorporated in one or more of the rubber-like layers 12, 12, preferably in all of layers 12, 12, and in the cover member 13, if a cover member is employed, comprises a uniform mixture of a rubbery conjugated diene polymer and finely-divided magnetite.

The following examples of resilient elastomeric compositions embodying my invention are typical of those which may be utilized in constructing the belt described above.

*Example I*

| Material: | Parts by weight |
|---|---|
| Natural rubber | 100.0 |
| Magnetite | 212.5 |
| Stearic acid | 5.0 |
| Rosin oil | 4.0 |
| Zinc oxide | 4.0 |
| Phenyl-beta-naphthylamine | 4.0 |
| Benzothiazyl disulfide | .6 |
| Sulfur | 2.8 |
| Total | 332.9 |

The rubbery composition was formed by milling the natural rubber on a roll mill and compounding the remaining ingredients into the rubber in the usual manner. The resulting rubbery compsition was vulcanized in a mold for 25 minutes at 285° F. The vulcanized composition has excellent physical properties exhibiting an adhesion strength to textile fabric of about 30 pounds per inch width, an elongation at rupture of about 550 per cent, a tensile strength of about 2300 pounds per square inch and excellent flexing properties. The particles of magnetite were firmly embedded in the mass of rubber composition and showed no tendency to separate therefrom even when the composition was flexed, behaving in this respect in much the same way as carbon black and also providing reinforcement to the rubbery composition in a manner similar to carbon black.

*Example II*

| Material: | Parts by weight |
|---|---|
| Rubbery butadiene-acrylonitrile copolymer (GR-S) 92% conversion | 100.0 |
| Magnetite | 290.0 |
| Carbon black | 20.0 |
| Pine tar | 3.5 |
| Zinc oxide | 1.0 |
| Phenyl-beta-naphthylamine | 1.0 |
| Benzothiazyl disulfide | .8 |
| Sulfur | 2.0 |
| Total | 418.3 |

The rubbery composition was compounded in a conventional manner, such as illustrated in Example I, and was vulcanized for 30 minutes at 280° F. and exhibited physical properties, when in the vulcanized condition, comparable to those exhibited by the vulcanized rubbery composition of Example I.

*Example III*

| Material: | Parts by weight |
|---|---|
| Natural rubber | 50.0 |
| Rubbery butadiene-acrylonitrile copolymer (GR-S) 92% conversion | 50.0 |
| Magnetite | 100.0 |
| Carbon black | 35.0 |
| Pine tar | 2.0 |
| Zinc oxide | 1.2 |
| Phenyl-beta-naphthylamine | 1.0 |
| Sulfur | 2.2 |
| Benzothiazyl disulfide | .7 |
| Total | 242.1 |

The natural rubber and rubbery butadiene-acrylonitrile copolymer were blended together on a roll mill and the remaining ingredients were compounded into the elastomeric blend in the usual manner. The composition was vulcanized in a mold for 20 minutes at 310° F. The vulcanized rubbery composition possessed physical properties equivalent to those exhibited by the vulcanized rubbery composition of Example I.

Industrial belts, such as conveyor belts and transmission belts, both flat and V-belts, have for many years been made from vulcanized rubber compositions reinforced with textile fabric or cord or with metal wire or cable. Rubber compositions have been well suited for this purpose because of their resilience and flexibility and their ability to withstand the severe conditions of impact, abrasion and flexing to which such belts are normally subjected in use. It has been found, however, that small particles of the rubber composition tend to break loose from the main body of the belt during use, a result caused at least partly by the repeated severe flexing which the belt undergoes as it passes around the pulleys or sheaves on which it is mounted and the extreme abrasion conditions to which the belt is subjected. In the case of conveyor belts, these particles become mixed with and contaminate the material being carried by the belt, and their separation is a difficult and expensive operation. By employing the magnetic resilient elastomeric composition of the present invention in such a belt, however, any particles of the belt which contaminate the material being conveyed may readily be separated therefrom (if the conveyed material is non-magnetic) by a conventional electromagnetic separator such as is commonly employed for removing small pieces of scrap metal from such material.

In the case of transmission belts, it has been necessary in the past to mount the belts under substantial tension to prevent slipping. However, such tension tends to shorten the life of the belt and is therefore desirably minimized. By employing transmission belts having a magnetic resilient composition included therein together with magnetic pulleys or sheaves the tension on the belt may be substantially reduced while at the same time minimizing danger of slipping.

Other advantages and uses of such belts, which combine the magnetic properties found in iron or steel with the resiliency, flexibility and abrasion resistance found in conventional rubber composition belts, will be apparent to those skilled in the art.

Compositions within the scope of this invention have excellent tensile strength, flexing properties and abrasion resistance, as compared to similar compositions containing no magnetite, and are particularly useful in articles which must withstand constant flexing, abrasion and sudden impact, such as conveyor or transmission belts.

Compositions within the purview of my invention are readily attracted by magnetic forces and, if particles of my resilient magnetic composition are placed in the magnetic field of a permanent magnet or electromagnet, the particles are drawn thereto. Therefore, small particles of my composition which inadvertently are intermixed with non-magnetic materials may readily be removed therefrom by merely subjecting the particles to a magnetic field.

Furthermore, compositions within the purview of this invention are extremely durable and are readily molded into numerous shapes and sizes.

It is clear that obvious modifications and variations may be made without departing from the spirit and scope of this invention as defined in the appended claims.

I claim:

1. An industrial belt comprising a reinforcing member including filamentary material embedded in a body of vulcanized elastomeric composition, said composition comprising a vulcanized rubbery conjugated diene polymer having uniformly dispersed therein from 65 to 300 parts by weight of finely-divided magnetite for every 100 parts by weight of polymer.

2. A conveyor belt comprising at least one textile fabric reinforcing member and a flexible resilient elastomeric member impregnated into and disposed over each face of each said reinforcing member, said elastomeric member comprising a vulcanized rubbery conjugated diene polymer and from 65 to 100 parts by weight of finely-divided magnetite for every 100 parts by weight of polymer, said magnetite being uniformly dispersed in said polymer and having a particle diameter from .01 to 20 microns.

3. A conveyor belt comprising a belt carcass which includes several textile fabric reinforcing members coated and impregnated on their outer faces with a flexible resilient elastomeric material and opposing each other in a face-to-face adherent relationship and a flexible resilient elastomeric cover member disposed over said carcass and in direct adherent contact therewith, said cover member comprising a vulcanized rubbery conjugated diene polymer and from 65 to 300 parts by weight of finely-divided magnetite for every 100 parts by weight of said polymer, said magnetite being uniformly dispersed throughout said polymer.

4. A conveyor belt comprising a belt carcass which includes several flexible fabric reinforcing members coated and impregnated on their faces with a flexible resilient elastomeric material and opposing each other in a face-to-face adherent relationship and a flexible resilient elastomeric cover member disposed over and in direct adherent contact with said carcass, said cover member comprising a vulcanized rubbery conjugated diene polymer and from 65 to 300 parts by weight of finely-divided magnetite for every 100 parts by weight of said polymer, said magnetite being uniformly dispersed in said polymer and having a particle diameter of from .01 to 20 microns.

5. A conveyor belt comprising a belt carcass which includes several flexible fabric reinforcing members coated and impregnated on their outer faces with a flexible resilient elastomeric material comprising a vulcanized rubbery conjugated diene polymer and from 65 to 300 parts by weight of finely-divided magnetite for every 100 parts by weight of said polymer, said magnetite being uniformly dispersed in said polymer and having a particle diameter of from .01 to 20 microns, said fabric reinforcing members opposing each other in a face-to-face adherent relationship, and a flexible resilient elastomeric cover member disposed over said carcass and in direct adherent contact therewith, said cover member comprising a vulcanized rubbery conjugated diene polymer and from 65 to 300 parts by weight of finely-divided magnetite for every 100 parts by weight of said polymer in said cover member, said magnetite in said cover member being uniformly dispersed therein and having a particle diameter of from .01 to 20 microns.

6. The method of making a laminated structure which comprises adhering several filamentary reinforcing members together in a face-to-face relationship by interposing therebetween a vulcanizable rubbery composition comprising a vulcanizable rubbery conjugated diene polymer and from 65 to 300 parts by weight of finely-divided magnetic for every 100 parts by weight of said polymer and vulcanizing the assembly to form an integral unit.

7. The method of making a laminated structure which comprises adhering several flexible textile fabric reinforcing members together in a face-to-face relationship by interposing between the faces of said reinforcing members a vulcanizable rubbery composition comprising a vulcanizable rubbery conjugated diene polymer and finely-divided magnetite for every 100 parts by weight to form an integral unit.

8. The method of making a laminated structure which comprises adhering several filamentary reinforcing members together in a face-to-face relationship by interposing therebetween a vulcanizable elastomeric composition comprising a vulcanizable rubbery conjugated diene polymer and from 65 to 300 parts by weight of finely-divided magnetite for every 100 parts by weight of said polymer to form a carcass, providing a cover member which comprises said vulcanizable elastomeric composition for said carcass, assembling said cover member over said carcass, and vulcanizing the assembly to form an integral unit.

CHALMER C. CURTIS.

References Cited in the file of this patent

UNITED STATES PATENTS

| Number | Name | Date |
| --- | --- | --- |
| 96,237 | Johnson | Oct. 26, 1869 |
| 900,392 | Kirkegaard | Oct. 6, 1908 |
| 1,994,534 | Robinson | Mar. 19, 1935 |
| 2,321,580 | Conradson | June 15, 1943 |
| 2,461,654 | Nassimbene | Feb. 15, 1949 |
| 2,564,312 | Rossman et al. | Aug. 14, 1951 |
| 2,566,441 | Camras | Sept. 4, 1951 |
| 2,594,893 | Faus | Apr. 29, 1952 |